US009732394B2

(12) United States Patent
Chin et al.

(10) Patent No.: US 9,732,394 B2
(45) Date of Patent: Aug. 15, 2017

(54) MANUFACTURING PROCESS FOR AEROSPACE BEARING ROLLING ELEMENTS

(75) Inventors: Herbert A. Chin, Charlotte, NC (US); William P. Ogden, Glastonbury, CT (US); David A. Haluck, Stuart, FL (US); Sean McCutchan, Glastonbury, CT (US); Ronald F. Spitzer, Charlotte, NC (US); Allen V. Keller, Torrington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1138 days.

(21) Appl. No.: 13/474,407

(22) Filed: May 17, 2012

(65) Prior Publication Data

US 2013/0306194 A1 Nov. 21, 2013

(51) Int. Cl.
*C21D 7/06* (2006.01)
*C23C 8/26* (2006.01)
(Continued)

(52) U.S. Cl.
CPC .............. *C21D 7/06* (2013.01); *B24B 1/00* (2013.01); *B24B 11/02* (2013.01); *B24B 19/06* (2013.01);
(Continued)

(58) Field of Classification Search
CPC  B24B 1/00; B24B 11/02; B24B 31/02; B24B 19/06; C21D 1/76; C21D 7/06;
(Continued)

(56) References Cited

U.S. PATENT DOCUMENTS 3,282,746 A   11/1966  Zlotek et al.
4,191,599 A   3/1980   Stickels et al.
(Continued)

FOREIGN PATENT DOCUMENTS

CA    2583207 A1   2/2006
EP    1411142 A1   4/2004
(Continued)

OTHER PUBLICATIONS

International Search Report and Written Opinion for related International Application No. PCT/US13/36282; report dated Oct. 11, 2013.
(Continued)

*Primary Examiner* — Jessee Roe
*Assistant Examiner* — Anthony Liang
(74) *Attorney, Agent, or Firm* — Cantor Colburn LLP

(57) ABSTRACT

A method of treating bearing rolling elements or bearing rings after a hardening and temper heat treatment is disclosed. The method may include treating the bearing rolling elements in a tumbling treatment and then in a duplex hardening treatment. The method may include treating the bearing rings in a peening treatment and then in a duplex hardening treatment. The duplex hardening treatment may also include at least one sequential process segment consisting of subjecting the bearing rolling element & rings to a nitriding process to increase the surface hardness and compressive residual stress. The combined two-step process produces a deep surface/sub-surface residual stress greater than the depth of the maximum operating von-Mises shear stress along with an ultra-hard surface with high magnitude of compressive residual stress. In so doing, the bearing ring and rolling elements will have significantly enhanced rolling contact fatigue resistance and resistance to surface imperfections and debris.

11 Claims, 4 Drawing Sheets

(51) Int. Cl.

| | |
|---|---|
| *C23C 8/36* | (2006.01) |
| *C23C 8/50* | (2006.01) |
| *C23C 8/02* | (2006.01) |
| *C23C 8/80* | (2006.01) |
| *C21D 1/76* | (2006.01) |
| *C21D 9/36* | (2006.01) |
| *C21D 9/40* | (2006.01) |
| *B24B 11/02* | (2006.01) |
| *B24B 19/06* | (2006.01) |
| *B24B 31/02* | (2006.01) |
| *B24B 1/00* | (2006.01) |
| *F16C 33/32* | (2006.01) |

(52) U.S. Cl.
 CPC ............... *B24B 31/02* (2013.01); *C21D 1/76* (2013.01); *C21D 9/36* (2013.01); *C21D 9/40* (2013.01); *C23C 8/02* (2013.01); *C23C 8/26* (2013.01); *C23C 8/36* (2013.01); *C23C 8/50* (2013.01); *C23C 8/80* (2013.01); *F16C 33/32* (2013.01); *F16C 2223/02* (2013.01); *F16C 2223/10* (2013.01); *F16C 2360/23* (2013.01); *Y02P 10/212* (2015.11); *Y10T 29/47* (2015.01)

(58) Field of Classification Search
 CPC .... C21D 9/36; C21D 9/40; C23C 8/02; C23C 8/26; C23C 8/36; C23C 8/50; F16C 2223/02; F16C 2223/10; F16C 33/32
 See application file for complete search history.

(56) References Cited

U.S. PATENT DOCUMENTS

| | | | |
|---|---|---|---|
| 5,397,188 | A | 3/1995 | Yoshizuka et al. |
| 5,399,207 | A | 3/1995 | Kemp |
| 6,315,455 | B1 | 11/2001 | Tanaka et al. |
| 7,556,668 | B2 | 7/2009 | Eason et al. |
| 7,600,556 | B2 † | 10/2009 | Koyama |
| 2004/0079310 | A1 | 4/2004 | Suzuki et al. |
| 2004/0079448 | A1 † | 4/2004 | Rhoads |
| 2006/0230856 | A1 | 10/2006 | Okita et al. |
| 2010/0296764 | A1 | 11/2010 | Strandell et al. |

FOREIGN PATENT DOCUMENTS

| | | |
|---|---|---|
| WO | WO-2005/100810 A1 | 10/2005 |
| WO | WO-2008/043062 A1 | 4/2008 |

OTHER PUBLICATIONS

Supplementary Partial European Search Report; Application No. 13790177.3-1362/2849920; Mailing Date: Jan. 13, 2016; 7 pages.
Kikuchi S. et al., Effect of Fine Particle Peening Treatment prior to Nitriding on Fatigue Properties of AISI 4135 Steel,,Journal of Solid Mechanics and Materials Engineering, 2008, vol. 2, No. 11, pp. 1444-1450.†

† cited by third party

Tumble process: Produces deep compressive residual stress for increased operating stress capability or Engineering margin Duplex Hardening (DH) Process: Produces ultra-hard, deep surface compressive residual stress for increased resistance to surface crack initiation and propagation → Enhanced Surface Durability

MANUFACTURING PROCESS FOR AEROSPACE BEARING ROLLING ELEMENTS

FIELD OF THE DISCLOSURE

The present disclosure generally relates to bearings and, more particularly, relates to a process for manufacturing high performance rolling elements and bearing rings for aerospace bearing applications.

BACKGROUND OF THE DISCLOSURE

Metallic rolling elements for aerospace bearing applications are typically made of specific materials and according to an exacting set of process steps. For example, they are often made of AISI 52100 or M50 steels and are subject to the prescriptive steps of (a) thermo and/or mechanical processing to control the shape and size of the rolling elements and rings; (b) heat treatment comprised of austenitizing, quenching, cold treating, and tempering to develop the desired hardness, compressive stress, fracture toughness and surface residual stress profile; (c) abrasive machining according to specification requirements; and (d) non-destructive inspection for quality assurance. The above prescriptive practices have evolved over the past many decades and have met the requirements of military and commercial main shaft bearings.

However, to increase the power output and performance of current engines, the aerospace propulsion industry has progressively increased the performance requirements for aerospace bearings, which includes rolling contact fatigue life and durability, higher temperature operation, higher speed and lighter weight. Consequently, the industry has now approached the material capability limits of conventionally produced rolling elements made of AISI 52100, M50 steels and the like including martensitic stainless steels. More recent engine designs have increased the engine loads to a point where they put far more applied stresses on the bearing rolling elements and rings.

In most rolling element bearings, the rolling element is a ball, which rolls between inner and outer rings called races. The balls are separated by pockets in a cage ring, which keeps them evenly spaced around the races. When running in operation under load, the metal of the bearing rolling elements is subjected to stresses of enormous intensity, which will cause cyclic flexure, compressive and secondary tensile stresses, and sliding of different contacting surfaces. It may cause deformation under extreme conditions. Over the course of the life of a bearing, the alternating rolling contact fatigue stresses may happen at a given stress volume in the rolling element many millions of times. In addition, because of the very small contact area (compared to cylindrical or conical rolling elements) between the rolling element and the races, the localized maximum stresses are especially severe. For this reason, the requirements of strength and rolling contact fatigue resistance properties are most demanding for bearing rolling elements and rings.

The total fatigue stress a bearing rolling element/ring experiences is equal to the surface/sub-surface residual stress plus the operational stress caused by the applied load. One way to increase the load capacity for the part is to decrease its residual stress. The residual stress is defined as the stress which remains inside a component or structure after the applied forces have been removed. On the one hand, compressive residual stress localized at the surface and sub-surface region of the component is beneficial as it off-sets the bearing operational contact stress thereby increasing the engineering margin of the rolling element and/or ring capability to operating stresses. On the other hand, tensile residual stress in the surface of the component is detrimental since it is additive to the operational stress, thereby decreasing the component's fatigue capacity and life.

Current manufacturing processes rely on the afore-mentioned heat treatment to provide the mechanical property requirements needed in bearing rolling elements and rings. The principle of bearing steel heat treatment is to produce a tempered martensitic structure to achieve the required balance of hardness, rolling contact fatigue resistance, fracture toughness and dimensional stability. While effective to a point, it simply does not meet the increased property requirements of high performance bearings into the future.

To better answer the challenges raised by the aerospace industry to produce increased capability bearing rolling elements, it is therefore desirable to increase the compressive residual stress in the surface & sub-surface region of the rolling elements and make the resulting surface capable of handling the increasing loads and speeds. Further, similar treatment to the surface of the raceway in a bearing ring is desirable as well.

SUMMARY OF THE DISCLOSURE

In accordance with one aspect of the present disclosure, a method of treating a bearing rolling element after a heat treatment is therefore disclosed. The method may include treating the bearing rolling element in (1) an optimized tumbling treatment to induce a surface/sub-surface compressive residual stress; and then (2) a duplex hardening surface treatment to induce another surface compressive residual stress.

The tumbling treatment may optionally include 1) placing the bearing rolling elements in barrels on a tumbling machine; and 2) operating the tumbling machine for a time sufficient to induce the surface/sub-surface compressive residual stress profile. It is also possible for the tumbling treatment to produce a plastically deformed surface/sub-surface region with surface/sub-surface compressive residual stress to a depth greater than a depth of a design maximum von-Mises shear stress. Moreover, the depth for the compressive residual stress may be at least about 0.020 inch.

Additionally, the bearing rolling element may optionally be made of a high strength, low or medium alloy martensitic steel comprising a first component selected from the group consisting of AISI 52100, AISI M50 and T1. Further, a tumbling media may be placed with the bearing rolling elements in the barrels on the tumbling machine during the tumbling treatment.

The duplex hardening treatment may optionally include subjecting the bearing rolling element to at least one sequential process segment to induce the surface compressive residual stress. The process segment may optionally consist of 1) subjecting the bearing rolling element to a boost period in an atmosphere containing active nitrogen; and 2) subjecting the bearing rolling element to a diffuse period in an atmosphere free of active nitrogen.

Optionally, the total process time for the duplex hardening treatment may be about 40 to 80 hours. The boost period may be about 2 to 20 hours each and the diffuse period may be about 2 to 60 hours each. Additionally, the treatment temperature may be maintained between about 400° C. and 600° C. Furthermore, the amount of active nitrogen used during boost period may be the same or varied.

It is possible for the duplex hardening treatment to introduce a surface compressive residual stress to a depth of about 0.004 inch and more. It is also possible for the duplex hardening treatment to introduce a surface compressive residual stress to a depth of from about 0.0008 inch to about 0.0036 inch.

Consequently, it is possible for the bearing rolling element to have an improved rolling contact fatigue/endurance limit life after undergoing the disclosed method. It is also possible for the bearing rolling element to form an ultra-hard surface and have an ultra-high compressive surface residual stress.

In accordance with another aspect of the present disclosure, a method of treating a bearing ring after a heat treatment is disclosed. The method may include treating the bearing ring (1) in an optimized mechanical or thermo-mechanical peening treatment to induce a surface/sub-surface compressive residual stress; and then (2) in a duplex hardening treatment to induce another surface compressive residual stress.

The peening treatment may optionally include 1) placing the bearing rings in a peening machine; and 2) operating the peening machine for a time sufficient to induce the surface/sub-surface compressive residual stress profile. It is also possible for the peening treatment to produce a plastically deformed surface/sub-surface region with surface/sub-surface compressive residual stress to a depth greater than a depth of a design maximum von-Mises shear stress. Moreover, the depth for the compressive residual stress may be at least about 0.020 inch.

The duplex hardening treatment may optionally include subjecting the bearing ring to at least one sequential process segment to induce the surface compressive residual stress. The process segment may optionally consist of 1) subjecting the bearing ring to a boost period in an atmosphere containing active nitrogen; and 2) subjecting the bearing ring to a diffuse period in an atmosphere free of active nitrogen.

Optionally, the total process time for the duplex hardening treatment of the bearing ring may be about 40 to 80 hours. The boost period may be about 2 to 20 hours each and the diffuse period may be about 2 to 60 hours each. Additionally, the treatment temperature may be maintained between about 400° C. and 600° C. Furthermore, the amount of active nitrogen used during boost period may be the same or varied.

It is possible for the duplex hardening treatment to introduce a surface compressive residual stress to a depth of about 0.004 inch and more for the bearing ring.

Consequently, it is possible for the bearing ring to have an improved rolling contact fatigue/endurance limit life after undergoing the disclosed method.

Further forms, embodiments, features, advantages, benefits, and aspects of the present disclosure will become more readily apparent from the following drawings and descriptions provided herein.

Before proceeding with the detailed description, it is to be appreciated that the following detailed description is merely exemplary in nature and is not intended to limit the invention or the application and uses thereof. Hence, although the present disclosure is, for convenience of explanation, depicted and described as shown in certain illustrative embodiments, it will be appreciated that it can be implemented in various other types of embodiments and equivalents, and in various other systems and environments. Furthermore, there is no intention to be bound by any theory presented in the preceding background or the following detailed description.

DETAILED DESCRIPTION OF THE DISCLOSURE

As indicated above, the life of bearings plays an important role in the design constraints of modern aerospace engines. The inventors have found that the life of bearings is determined primarily by spatting (i.e., the detachment of material following the initiation of cracks at or below the contact surface), due to distress caused by surface roughness, corrosion, nicks, dents, debris ingestion or inadequate lubrication. The spalling may occur on the surface of a bearing rolling element and/or a bearing ring.

Another type of distress, known as rolling contact fatigue (RCF) can be defined as crack propagation caused by the near-surface alternating stress within the rolling-contact bodies, which eventually leads to material removal, i.e. spalling. It is a common type of failure encountered in bearings, even those which are well lubricated. One possible cause of such distress is the near-surface plastic deformation which leads to microcracks, grown or connected by a fatigue mechanism. It is also possible that the defects may grow in a ductile manner by progressive shear of the surface and/or sub-surface layers. RCF is affected partially by surface/sub-surface residual stresses, the type of material utilized, and the hardness/toughness of the bearing rolling elements.

Residual stresses in general can also be introduced by thermo-mechanical processes such as turning, grinding, burnishing, polishing, lapping, and shot or shock peening. These processes induce localized surface/sub-surface residual stress. In addition, residual stresses can be introduced by heat treatment, rolling, forging, and welding processes. These processes tend to induce longer-range residual stress.

With these current surface/sub-surface residual stress introduction methodologies and limitations in mind, the bearing rolling elements of the present disclosure are treated by a process described herein to achieve improved surface stress capability, rolling contact fatigue resistance and resistance to third body debris. In doing so, the resulting bearing rolling elements demonstrate superior performance in comparison to elements that are not treated. Aerospace components utilizing such rolling elements can therefore achieve greater performance as well.

Figure 1:
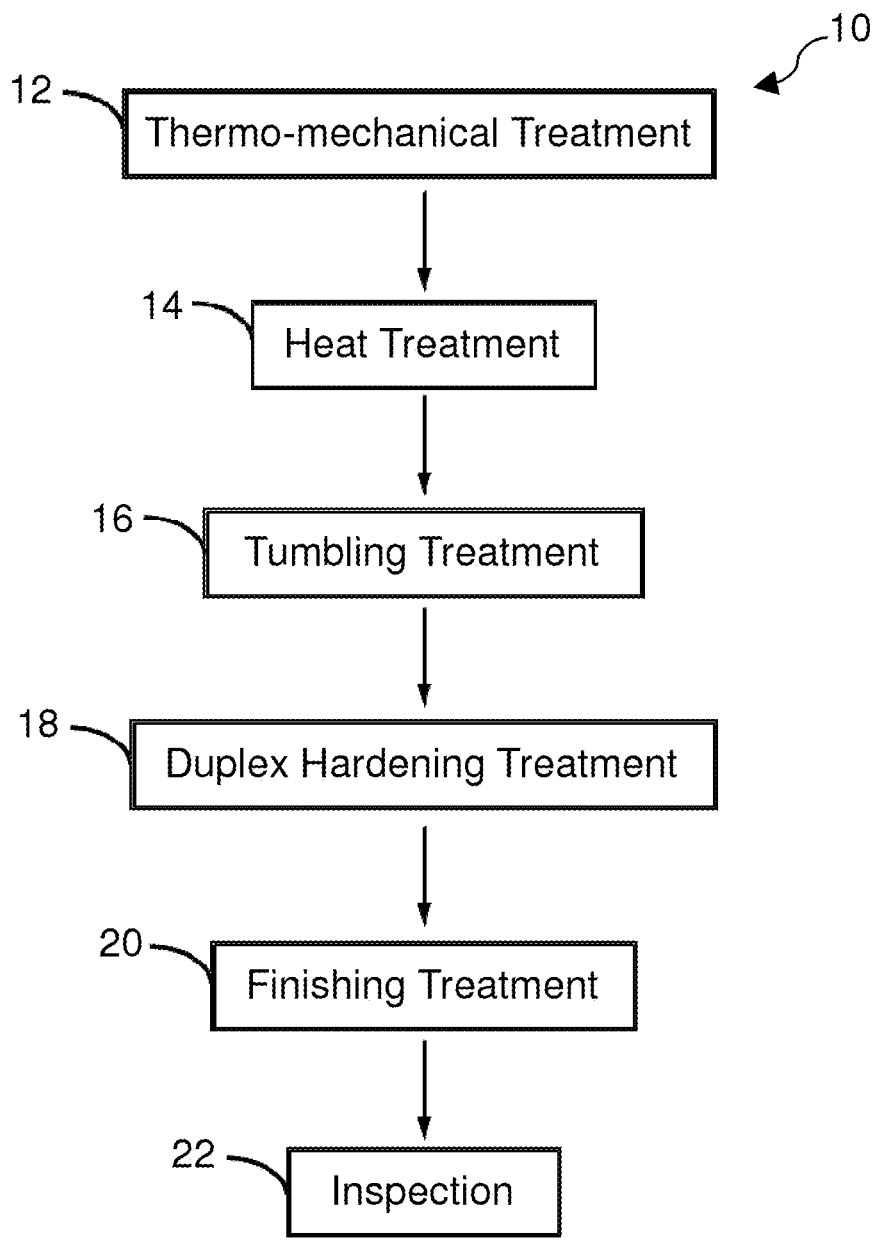
FIG. 1 is a flow chart depicting a method of treating a bearing rolling element according to the present disclosure.

Referring now to the drawings and with specific reference to FIG. 1, a method for treating bearing components according to the present disclosure is shown in detail. More specifically, one embodiment of the process of the present disclosure, indicated generally by the numeral 10, may sequentially include a thermo-mechanical treatment 12, a heat treatment 14, a tumbling treatment 16, a duplex hardening treatment 18, a finishing treatment 20, and an inspection treatment 22, each of which will now be described in greater detail in the paragraphs that follow for a bearing rolling element.

The thermo-mechanical treatment 12 may include steps necessary to produce spheres from a linear stock material. For example, it may include making steel balls from steel wire or rod. Such a process may include: cutting wire coil or rod of steel into needed lengths and diameters; forging or cold heading the cut steel wire or rod between hemispherical dies to form a ball shape referred to as a ball blank; deburring the flash around the ball blanks produced during the forging/heading operation; and deflashing the central ring formed around the middle of the ball blanks. Alternative methods used for producing the ball blanks may include processes such as casting, machining, roll formed barstock and hot isostatically press forming. At the end of this treatment 12, the rough steel balls are produced at a desired dimension; for example, at least 0.010 inch diameter oversized. Other dimensions are possible.

In one embodiment, the bearing rolling element may optionally be made of a high strength, low or medium alloy martensitic steel comprising a first component selected from the group consisting of AISI 52100, AISI M50 and T1.

The heat treatment 14 may include steps necessary to transform the steel balls, resulting from step 12, so as to satisfy approved aerospace practices. For example, the steps may include: putting the rough steel balls into a heat treating furnace (austenitizing) at about 840° C., for example, for a sufficient time to accomplish said austenitization through the entire cross-section of the ball blank; rapid succession quenching the rough steel balls into an oil bath to rapidly cool them to about 40° C., for example; heating the rough steel balls in a second oven to about 150° C. for example; and letting the rough steel balls cool in air. This whole heat treatment 14 makes rough steel balls both hard and fracture tough. At the end of this treatment 14, the rough steel balls are left the same size as before, i.e., about 0.010 inch diameter oversized in the above example. Alternative methods for heat treatment may include the use of vacuum, salt bath, fluidized bed or induction for austenitization, followed by controlled post austenitization cooling employing pressurized gas quench or immersion in a controlled quench media like molten salt or oil.

The tumbling treatment 16 may comprise steps necessary to transform the heat treated steel balls into steel balls having surfaces which are characterized with high, uniform, and deep surface/sub-surface compressive residual stress. In one embodiment of the tumbling treatment 16, the rough steel balls are loaded into a barrel of a tumbling machine. Then the barrel is rotated, spun, tilted, vibrated, shaken, or raised and then dropped by the tumbling machine so that the rough steel balls inside the barrel impact each other with sufficient force to cause localized deformation of the surface of the rough steel balls. Alternatively, the tumbling container may involve a counter-rotation motion.

In one embodiment, the tumbling treatment 16 is performed at ambient temperature from about 12° C. to about 40° C. In another embodiment of the tumbling treatment 16, the rough steel balls and a tumbling media are loaded into a barrel of a tumbling machine. Then the barrel is rotated, spun, tilted, vibrated, shaken, or raised and then dropped by the tumbling machine so that the rough steel balls inside the barrel impact each other with sufficient force to cause deformation of the surface of the balls.

The tumbling treatment 16 may produce rough steel balls with a plastically deformed surface/sub-surface region with compressive residual stresses to a depth greater than where the design maximum von-Mises shear stress is located. In one embodiment, the depth for the compressive residual stress may be at least about 0.020 inch. The tumbling treatment 16 may produce surface/sub-surface compressive residual stresses that are additive to the compressive residual stresses induced in the prior heat treatment. The operation of the tumbling treatment 16 may be optimized to many different parameters, including ball size, the kinetic energy developed when the ball impact each other, the ratio of ball load to barrel size, the rate of the rotation of the barrel, and the tumbling duration. Such optimization may ensure that there is complete coverage of the ball surface with highly uniform deep surface/sub-surface compressive residual stress. Further, such optimization may ensure that the plastically deformed region does not exhaust the fatigue capability of the metal surface of the balls, as excessive tumbling can lead to excessive surface/sub-surface plastic deformation. Such optimization may be carried out by conducting correlation testing of selected parameters of the tumbling operation with the resulting surface compressive residual stresses formed in the steel ball.

In another embodiment, the method to induce surface compressive residual stress in bearing rolling elements may employ alternate methods other than the gravity induced tumbling treatment. For example, surface deformation and compressive residual stress induction may be achieved by propelling rough steel balls by gas or air bursts into collision impacts with either each other or with a flat, convex, or concave surface of choice.

Turning to the duplex hardening treatment 18 step, it may include steps necessary to transform the treated steel balls into steel balls having surfaces which are characterized with an ultra-hard, ultra-high compressive residual stress at the surface up to a depth of about 0.004 inch or more. In one embodiment, the duplex hardening treatment 18 may affords steel balls having surfaces a compressive residual stress to a depth of from about 0.0008 inch to about 0.0036 inch. In one embodiment of the duplex hardening treatment 18, surface nitriding is performed on the rough steel balls after the tumbling treatment or duplex hardening is performed after post tumble hard grind operation. Nitriding is a heat treating process that diffuses nitrogen into the surface of a metal to create a case hardened surface. Nitriding treatment of the present disclosure may include the use of constant, fluctuating or Boost/Diffuse (BD) type and may involve a nitrogen source involving a gaseous atmosphere, molten salt bath or fluidized bed. During a Boost period, the rough steel balls are subjected to a higher active nitrogen-containing atmosphere. During the Diffuse period, no additional nitrogen is added to the steel. Alternatively, nitriding treatment may be a plasma nitriding method which uses a hot-wall pulsed DC plasma nitride furnace. It is anticipated that controlled gas nitriding may be used in the nitriding treatment as well.

The nitrogen potential of the atmosphere within the furnace may be determined automatically throughout the nitriding process. The measured nitrogen potential may then be compared with previous selected setpoint values by a control system which may adjust the composition of the incoming gas mixture as needed to achieve the desired nitrogen potential. In addition, the required number of Boost/Diffuse periods can be programmed into the control system for automatic operation.

Appropriate values may also be selected for the key parameters for the nitriding process such as nitriding temperature, total nitriding time, and percentage of time in Boost period and corresponding active nitrogen potential during Boost period. Selections may be influenced by the steel type of the rough steel balls, prior heat treatment, prior tumbling treatment, desired compressive residual stress profile, part geometry and other material property requirements. The nitriding temperature is expected to be in the range of from about 400° C. to about 600° C. Other temperatures are possible. The time needed to absorb a given amount of nitrogen varies with the nitriding temperature and is expected to be in the range of from about 40 to about 80 hours, during which the Boost periods last from about 2 to about 20 hours while the Diffuse periods last about from about 2 to about 60 hours. The Boost periods may also be of equal or different length. The atmosphere may contain about 5 to 25 volume % nitrogen during the Boost periods, with the amount of active nitrogen during each Boost period being the same or varied depending on desired outcome.

In summary, the duplex hardening treatment 18 hardens the rough steel ball surface up to about 0.004 inch in depth; forms an ultra-hard surface that resists localized plastic deformation and/or surface texture alteration; and results in an ultra-high compressive residual stress near the surface which significantly decreases the propensity of surface crack initiation and propagation.

The next step, as indicated above, is finishing treatment 20. The finishing treatment 20 may include steps necessary to transform the rough steel balls into the correct form and dimensions. The finishing treatment may include: descaling; grinding; filing; lapping; honing, polishing; burnishing; washing; drying; and passivation. At the end of the finishing treatment 20, the steel balls become bearing rolling elements which are in near perfect spherical form and whose deviation in the roundness may be less than about a few ten thousandths of an inch in diameter when compared with their desired size.

Finally, the inspection treatment 22 includes final inspection of the bearing rolling element for size, form, surface finish and tolerance against the desired specifications. This step may be conducted on a sampling basis or by other methods needed for the sake of efficiency. Moreover, the inspection step 22 may rely on analysis performed by means of microscopes and other precision equipment. If any are found to be out of tolerance, additional steps of cold treatment, heading, grinding, cleaning, descaling, and cutting or any of the foregoing steps may be conducted again to try and reach acceptance.

Figure 2:
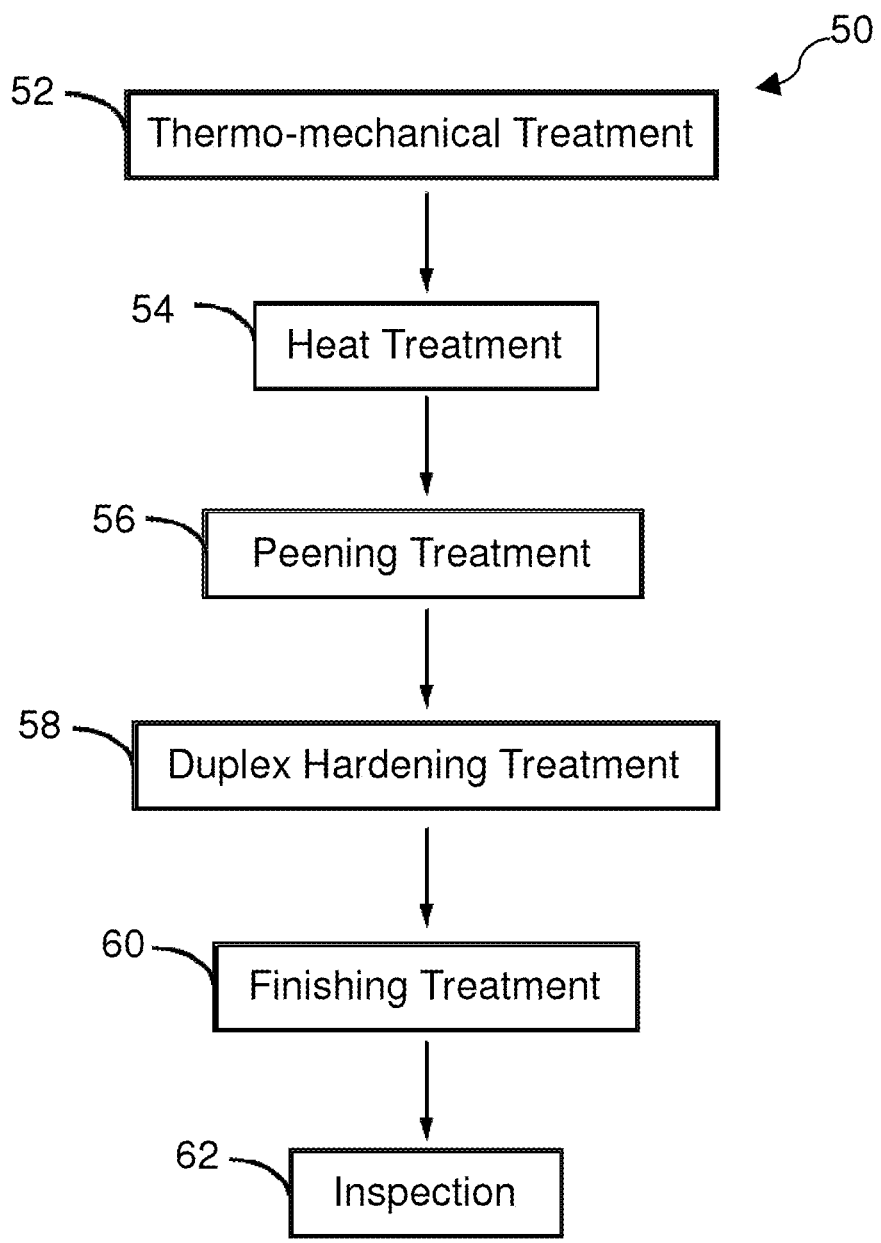
FIG. 2 is a flow chart illustrating a method of treating a bearing ring according to the present disclosure.

Another embodiment of the method for treating bearing components is referred to in FIG. 2 as reference numeral 50. Like numerals are used to identify like components as between FIGS. 1 and 2, except that the numerals have been increased by 40 (e.g., 10 in FIG. 1 is now 50 in FIG. 2). Method 50 describes steps treating a bearing ring. More specifically, one embodiment of the process of the present disclosure may sequentially include a thermo-mechanical treatment 52, a heat treatment 54, a peening treatment 56, a duplex hardening treatment 58, a finishing treatment 60, and an inspection treatment 62, each of which will now be described in greater detail in the paragraphs that follow.

The thermo-mechanical treatment 52 may include steps necessary to produce bearing rings from a stock material including a cylindrical bar, hot isostatically pressed powder metallurgy preform or a seamless tube. For example, treatment 52 may include forging, hot rolling forming, turning molding, or cold compression molding. At the end of this treatment 52, the rough bearing rings are produced at a desired dimension; for example, at least 0.010 inch diameter oversized on the raceway surface. Other dimensions are certainly possible.

The heat treatment 54 may include steps necessary to transform the rough bearing rings, resulting from step 52, so as to satisfy approved aerospace practices. For example, the steps may include: putting the rough bearing rings through an austenitization step followed in succession by quenching, cold treatment and tempering. This whole heat treatment 54 makes the rough bearing rings both hard and fracture tough. At the end of this treatment 54, the rough bearing rings are left the same size as before, i.e., about 0.010 inch diameter oversized in the above example.

The peening treatment 56 may comprise steps necessary to transform the heat treated bearing rings into bearing rings having surfaces which are characterized with high, uniform, and deep surface/sub-surface compressive residual stress. The steps may include a shot peening process, a cavitation peening process, a water jet peening process, ultrasonic peening, and laser shock peening. During the treatment 56, the rough bearing rings were hit with sufficient forces to cause localized plastic deformation of the surface of the rough bearing rings.

The peening treatment 56 may produce rough bearing rings with a plastically deformed surface/sub-surface region with compressive residual stresses to a depth greater than where the design maximum von-Mises shear stress is located. The peening treatment 56 may produce surface/sub-surface compressive residual stresses that are additive to the compressive residual stresses induced in the prior heat treatment. The operation of the peening treatment 56 may be optimized to many different parameters, including the ring harden and temper heat treatment, the ring diameter, the force of the peening media, the frequency of the peening media, and the peening duration. Such optimization may ensure that there is roughly complete coverage of the raceway surface with highly uniform deep surface/sub-surface compressive residual stress. Further, such optimization should ensure that the plastically deformed region of the raceway does not exhaust the fatigue capability of the metal surface of the bearing rings. Such optimization may be carried out by conducting correlation testing of selected parameters of the peening operation with the resulting surface compressive residual stresses and microstructure formed in the bearing ring.

Turning to the duplex hardening treatment 58 step, it may include steps necessary to transform the treated bearing rings into bearing rings having surfaces which are characterized with an ultra-hard, ultra-high compressive residual stress at the surface up to a depth of about 0.004 inch. In one embodiment of the duplex hardening treatment 58, surface nitriding is performed on the rough bearing rings after the peening treatment. Nitriding is a heat treating process that diffuses nitrogen into the surface of a metal to create a case hardened surface. Nitriding treatment of the present disclosure may be of the Boost/Diffuse (BD) type. During a Boost period, the rough steel balls are subjected to a higher active nitrogen-containing atmosphere. During the Diffuse period, no additional nitrogen is added to the steel. Alternatively, Nitriding treatment may be a plasma nitriding method which uses a hot-wall pulsed DC plasma nitride furnace. It is anticipated that controlled gas nitriding may be used in the nitriding treatment as well. Parameters of the duplex hardening treatment 58 are controlled to harden the raceway surface up to about 0.004 inch in depth; form an ultra-hard surface that resists localized plastic deformation and/or surface texture alteration; and result in an ultra-high compressive residual stress near the surface which significantly decreases the propensity of surface crack initiation and propagation.

The next step is finishing treatment 60. The finishing treatment 60 may include steps necessary to transform the rough bearing ring into the correct form and dimensions. The finishing treatment may include: descaling; grinding; filing; lapping; polishing; burnishing; washing; drying; demagnetizing; and passivation. At the end of the finishing treatment 60, the bearing rings are in near perfect dimensions and whose deviation in size may be less than about a few ten thousandths of an inch when compared with their desired size.

Finally, the inspection treatment 62 includes final inspection of the bearing rings for size, form, surface finish and tolerance against the desired specifications. This step may be conducted on a sampling basis or by other methods needed for the sake of efficiency. Moreover, the inspection step 62 may rely on analysis performed by means of microscopes and other precision equipment. If any are found to be out of tolerance, additional steps of cold treatment, heading, grinding, cleaning, descaling, and cutting or any of the foregoing steps may be conducted again to try and reach acceptance.

From the foregoing, it can be seen that the present disclosure has numerous beneficial effects relative to the prior art in terms of enhanced fatigue life. For example, the tumbling treatment 16 affords compressive residual stresses to the ball surface and sub-surface region at a depth deeper than the depth of the bearing's maximum von Mises sub-surface sheer stress. As a result, this induced compressive residual stress lowers the magnitude of the bearing rolling contact stress directly by simple subtraction, thereby providing increased capability and/or engineering margin to the bearing. In addition, the present disclosure has the second beneficial effect of producing deep compressive residual stress which is additive to that formed by the prior heat treatment.

Figure 3:
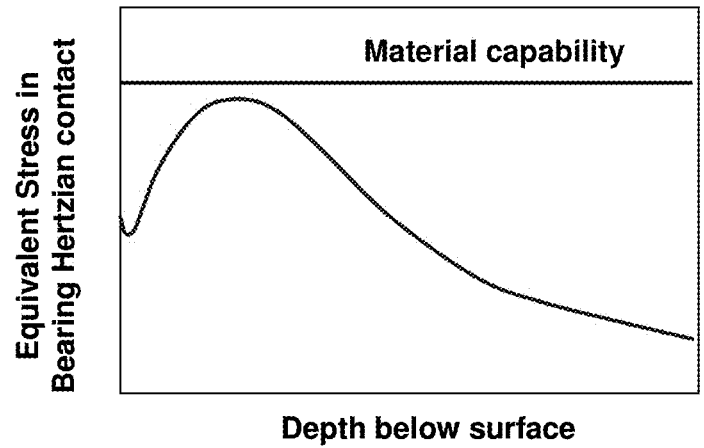
FIG. 3 is a chart graphically depicting equivalent stress versus depth for bearing Hertzian contact after a typical prior art heat treatment.
Figure 4:
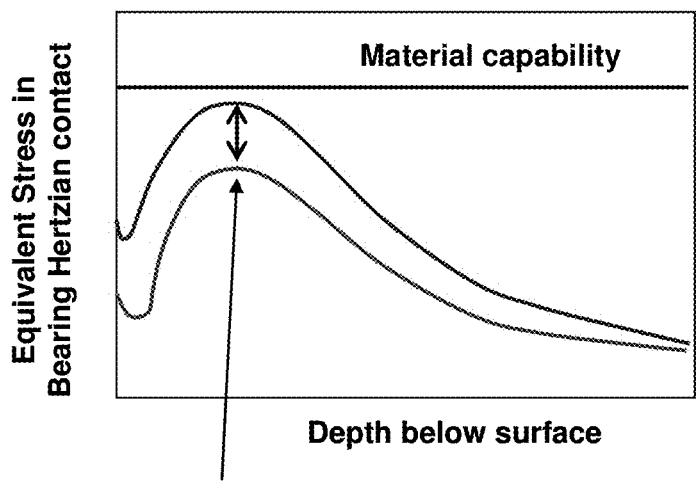
FIG. 4 is a similar chart to FIG. 3, but depicting the effect of optimized tumbling process of one embodiment of the present invention on the equivalent stress versus depth for bearing Hertzian contact.

The above two benefits can be better understood by referring to FIGS. 3 and 4. For the sake of understanding FIGS. 3 and 4, the inventors wish to point out that the Hertzian contact area referred to therein is the apparent area of contact between two nonconforming solid bodies, such as a rolling element and its raceway, when pressed against each other by the applied operational load, as calculated from Hertz's equations of elastic deformation.

Starting with FIG. 3, a typical prior art bearing rolling element after heat treatment generates a plot of the depth distribution of the von Mises equivalent stress below the center line of the Hertzian contact area. The difference between the maximum of the von Mises equivalent stress and the material capability is an indication of the remaining operating stress capability for the bearing rolling elements.

Recognizing that opportunity, the plot of FIG. 4 depicts the improvement achieved by the present inventors. More specifically, it compares the effects on the equivalent stress versus depth of a bearing Hertzian contact with and without a tumbling treatment of the present disclosure after the heat treatment. The plot shows that a process with the tumbling treatment of the present disclosure (bottom curve) introduces a larger compressive residual stress across the same region below the surface than a process without the tumbling treatment (top curve). As a result, the von Mises stress is lowered across a deep region below the surface of the bearing. Here, it is to be understood that the tumbling treatment induces compressive residual stress at a depth deeper than the location of the maximum von Mises sub-surface sheer stress, and the induction of the compressive residual stress is additive to that of the prior heat treatment. The margin between the bearing's maximum von Mises sub-surface shear stress and the material capacity is therefore widened. Consequently, the remaining operating stress capability for the bearing increases after the tumbling treatment of the present disclosure, and thus, the RCF endurance limit capability for the bearing rolling element is increased.

An additional beneficial effect of the present disclosure is that it produces an ultra-hard, ultra-high compressive residual stress in the surface at a depth of about 0.004 inch. The ultra-hard surface makes the bearing rolling element extremely resistant to surface damages resulting from over-rolling of hard or soft particles that may be present in the lubrication system and/or abnormal wear of other components around the bearing compartment including seal materials. Further, ultra-high compressive residual stress at depth of about 0.004 inch decreases the likelihood of the initiation and propagation of a surface crack. This benefit can be better understood by referring to FIGS. 5 and 6.

Figure 5:
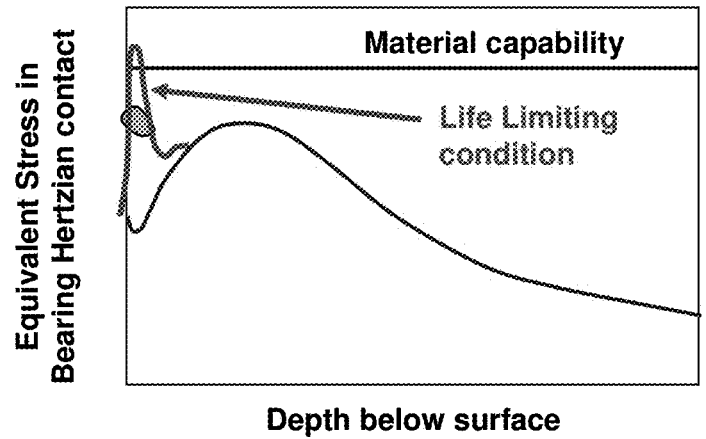
FIG. 5 is a chart graphically depicting the effect of a hard particle on the equivalent stress versus depth at the surface in a bearing Hertzian contact.

FIG. 5 is a graphical depiction of the depth distribution of the von Mises equivalent stress for the damage a hard particle can cause to a typical bearing rolling element without undergoing a duplex hardening treatment. The resulting sharp peak of the von Mises equivalent stress just beneath the surface is influenced by the sharp edged indentations of hard foreign particles. The inventors have found that the stress concentrations on the edges of the Hertzian micro-contacts promote material fatigue and damage initiation on or near the surface. Consequently, bearing life is reduced. In FIG. 5, the peak of the von Mises equivalent stress already exceeds the material capability of the bearing rolling element, and thus may cause surface failure and lead to a decreased RCF life limit.

Figure 6:
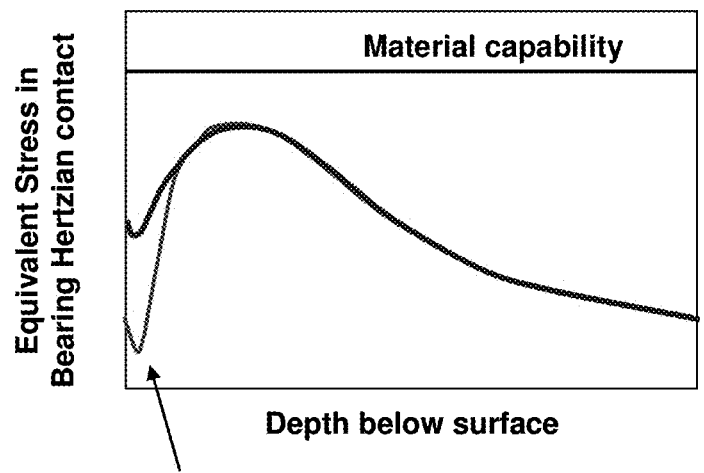
FIG. 6 is a chart graphically depicting the effect of the duplex hardening process of one embodiment of the present disclosure on the equivalent stress versus depth of a bearing Hertzian contact.

On the other hand, FIG. 6 is a graphical depiction of the effect of a duplex hardening treatment on the depth distribution of the of the von Mises equivalent stress for a bearing rolling element according to the present disclosure. As shown in FIG. 6, the duplex hardening treatment induces an ultra-high compressive residual stress just beneath the surface of the bearing rolling element. Hence, the von Mises equivalent stress is lowered substantially near the surface below the center line of the Hertzian contact area. Such a profile provides more capacity for the surface to counteract the effect of a hard foreign particle, and decreases the propensity of surface crack initiation and propagation.

INDUSTRIAL APPLICABILITY

From the foregoing, it can be seen that the present disclosure sets forth a method of rolling bearing manufacture which greatly improves the prior art. Such a method may find industrial applicability in many applications including, but not limited to, aerospace applications such as bearings for gas turbine engines.

By combining the strengths of a tumbling treatment and a duplex hardening treatment and by integrating the two treatments in the manufacturing process after a heat treatment, the present disclosure provided a novel process to make a superior performing bearing rolling element. The present disclosure improves and enhances current steel material capability to meet advanced metallic bearing rolling elements requirements. With the present novel process, an aerospace bearing rolling element is produced which has increased RCF endurance limit capability and enhanced surface damage resistance, both of which contribute to higher engine performance. Moreover, such resulting bearings open up new possibilities for gas turbine engine performance which have heretofore been limited by conventional bearing designs and manufacturing processes.

While the invention has been described with reference to certain embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A method of treating bearing components after a heat treatment, the method comprising:
    performing a tumbling treatment of bearing rolling elements to induce a first surface/sub-surface compressive residual stress into the bearing rolling element at a first depth; and
    applying duplex hardening treatment after the tumbling treatment to induce a second surface compressive residual stress into the bearing rolling element;
    wherein the duplex hardening treatment introduces the second surface compressive residual stress to a second depth different than the first depth and of no more than about 0.004 inch.

2. The method of claim 1, wherein the tumbling treatment comprises:
    placing the bearing rolling elements in barrels on a tumbling machine; and
    operating the tumbling machine for a time sufficient to induce the first surface/sub-surface compressive residual stress profile.

3. The method of claim 2, wherein the tumbling treatment comprises producing a plastically deformed surface/subsurface region with the first surface/subsurface compressive residual stress to a first depth greater than a depth of a design maximum von-Mises shear stress.

4. The method of claim 3, wherein the first depth is at least about 0.020 inch.

5. The method of claim 1, wherein the bearing rolling element is made of a high strength, low or medium alloy martensitic steel comprising AISI 52100 and AISI M50.

6. The method of claim 1, wherein a tumbling media is placed with the bearing rolling elements in the barrels on the tumbling machine.

7. The method of claim 1, wherein the duplex hardening treatment
    comprises:
    subjecting the bearing rolling element to at least one sequential process segment to induce the first surface compressive residual stress, wherein the process segment consists of subjecting the bearing rolling element to a boost period in an atmosphere containing active nitrogen, and then subjecting the bearing rolling element to a diffuse period in an atmosphere free of active nitrogen.

8. The method of claim 7, wherein a total process time during all boost and diffuse periods is about 40 to 80 hours, comprising boost periods of about 2 to 20 hours each, and diffuse periods of about 2 to 60 hours each, wherein a temperature is maintained between about 400° C. and about 600° C. during both the boost and diffuse periods, and wherein an amount of active nitrogen used during each boost periods may be the same or varied.

9. The method of claim 1, wherein the second depth is in the range from about 0.0008 inch to about 0.0036 inch.

10. The method of claim 1, wherein the bearing rolling element has an improved rolling contact fatigue/endurance limit life.

11. The method of claim 1, wherein the bearing rolling element forms a surface having increased hardness compared to an untreated surface, and has a compressive surface residual stress greater than the untreated surface.

* * * * *